W. T. SNELL.
PACKING BOX.
APPLICATION FILED SEPT. 15, 1915.

1,194,087.

Patented Aug. 8, 1916.

WITNESSES
Geo. L. Blume.
J. C. Larsen

INVENTOR
William T. Snell
BY
ATTORNEYS

UNITED STATES PATENT OFFICE.

WILLIAM T. SNELL, OF EL PASO, TEXAS.

PACKING-BOX.

1,194,087.  Specification of Letters Patent.  Patented Aug. 8, 1916.

Application filed September 15, 1915. Serial No. 50,745.

*To all whom it may concern:*

Be it known that I, WILLIAM T. SNELL, a citizen of the United States, and a resident of El Paso, in the county of El Paso and State of Texas, have invented certain new and useful Improvements in Packing-Boxes, of which the following is a specification.

My invention relates to packing boxes for outside packed plunger pumps, piston rods, and valve stems, of the class shown and described in my Letters Patent of the United States, Nos. 1,018,938 and 1,057,363, bearing dates of Feb. 27, 1912, and March 25, 1913, respectively, and the main object of the invention is to provide an improved and simplified form of such devices.

My invention is fully described in the following specification, of which the accompanying drawings form a part, in which like characters refer to like parts in each of the views, and in which:—

Figure 1:
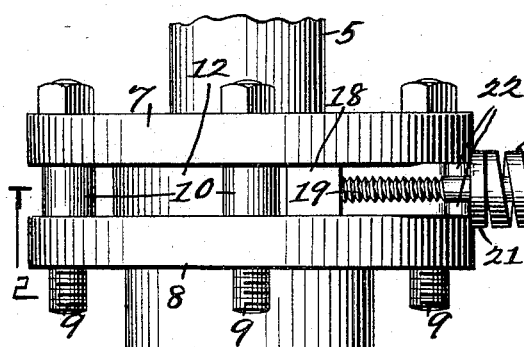
Figure 3:
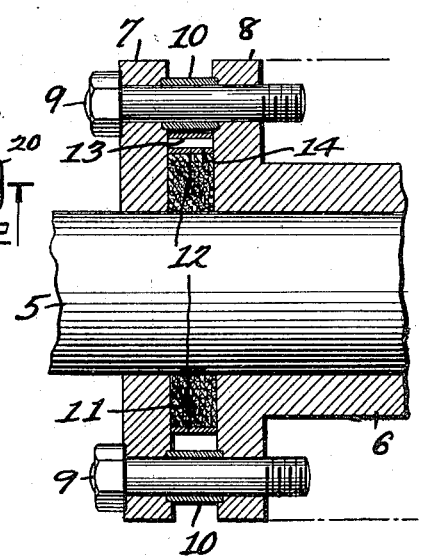
Figure 2:
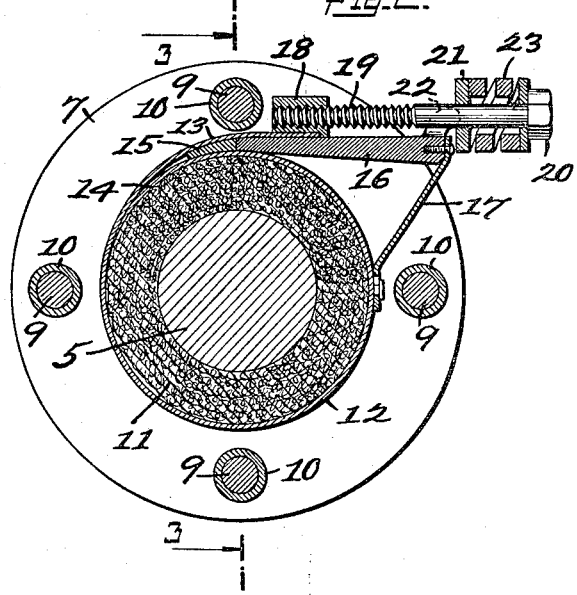

Figure 1 is a side elevation of a portion of a piston rod provided with my improved packing box; Fig. 2 is a section taken on the line 2—2 of Fig. 1; and Fig. 3 is a section taken on the line 3—3 of Fig. 2.

In the drawings forming a part of this application I have shown, fragmentarily, a piston rod 5 slidably mounted in a bush 6 serving as a filler for a stuffing-box, not shown, when the device is in use, said rod 5 being also passed through a ring 7 held to the flange 8 of the bush by means of bolts 9 and held in spaced relationship by means of sleeves 10 on said bolts.

A suitable packing 11 is held between the ring 7 and flange 8 and within a circular strap 12 the outer end 13 of which overlies the inner end 14 and said inner end carries a fixed, wedge-shaped, projection 15 of arcuate form which serves as a shoulder for a toggle-wedge 16 held in desired relationship with respect to the strap 12 by means of a strip 17.

The outer end 13 of the strap is secured in any desired manner to a block 18 which is internally screw threaded to receive a screw 19 having an angular head 20 whereby it may be rotated. Mounted on the screw 19 is a washer 21 which is held by means of two spaced lugs 22 on the toggle-wedge 16 which enter suitable recesses in the face of said washer, as indicated by dotted lines, and I interpose a coil-spring 23 between the screw head 20 and the washer 21.

Setting up on the screw 19 draws the block 18 toward the washer 21, thereby tightening the strap 12 around the packing 11 and compressing the latter around the piston rod 5 to prevent leakage but this compression is never enough to prevent free piston rod movement. This compression of the packing 11 also forces the same into a close and non-leakable contact with the ring 7 and flange 8, and a tight packing results which does not interfere in any way with the piston rod movement. The strip 17 is detachable from the strap 12 in order that the said strap with its connected parts other than the toggle-wedge 16 and its strip 17 may be removed as a unit, without disturbing the bolts 9, but access to the packing is also possible by removing said bolts and moving the ring 7 away from the flange 8.

The spring 23 serves to maintain a resilient tension on the strap and thus a constant compression of the packing 11 results sufficient to prevent leakage though yielding if necessary to undue strains in the piston rod movement, the spring also exerting a progressive strain on the strap and a progressive compression on the packing as the latter wears away on its piston rod contacting surface.

My invention is very simple though highly efficient, and I reserve the right to make changes in the details shown and described which properly come within the scope of the invention and of the following claims.

Having fully described my invention, what I claim as new, and desire to secure by Letters Patent, is:—

1. The combination with a piston rod, of a tubular, flanged bush, a ring held to said flange in spaced relationship, packing material surrounding the rod between said ring and flange, a strap surrounding said packing and provided with a projection adjacent its inner end, a block secured to the outer end of said strap, a headed screw threaded into said block, and means interposed between the head of said screw and said strap projection for forcing said packing material into contact with said piston rod when said screw is set up.

2. The combination with a piston rod, of a tubular, flanged bush, a ring held in spaced relationship with said flange, packing material surrounding said rod between said ring and flange, a strap surrounding said packing and provided with a projection adjacent its inner end, a block secured to the outer end of said strap, a headed screw threaded into said block, and a toggle-wedge interposed between said screw head and said strap projection for forcing said packing material into contact with said piston rod when said screw is set up.

3. The combination with a piston rod, of a tubular, flanged bush, a ring held in spaced relationship with said flange, packing material surrounding said rod between said ring and flange, a strap surrounding said packing and provided with a projection on the inner end thereof, a block secured to the outer end of said strap, a headed screw threaded into said block, a washer on said screw, and a toggle-wedge interposed between said washer and said projection, said screw head limiting outward washer movement.

4. The combination with a piston rod, of a tubular, flanged bush, a ring held in spaced relationship with said flange, packing material surrounding said rod between said ring and flange, a strap surrounding said material and provided with a projection at its inner end, a block secured to the outer end of said strap, a headed screw threaded into said block, a washer on said screw, a coil spring interposed between said washer and screw head, and a toggle-wedge interposed between said washer and said projection.

5. The combination with a piston rod, of a flanged bush, a ring held in spaced relationship with said flange, packing material around said rod between said ring and flange, a strap encircling said material and provided with a projection at its inner end, a block secured to the outer end of said strap, a headed screw threaded into said block, a toggle-wedge interposed between said screw head and said projection, and a strip in detachable connection with said strap for maintaining said toggle-wedge in position.

In testimony whereof I have signed my name to this specification in the presence of two subscribing witnesses.

WILLIAM T. SNELL.

Witnesses:
J. T. O'ROURKE,
ALBERT SCHURINGE.

Copies of this patent may be obtained for five cents each, by addressing the "Commissioner of Patents, Washington, D. C."